United States Patent
Roth et al.

(10) Patent No.: US 10,451,398 B2
(45) Date of Patent: Oct. 22, 2019

(54) COORDINATE MEASURING MACHINE AND METHOD FOR COMPENSATING FOR LARGE WORKPIECE MASSES

(71) Applicant: CARL ZEISS INDUSTRIELLE MESSTECHNIK GMBH, Oberkochen (DE)

(72) Inventors: Roland Roth, Waldstetten (DE); Werner Leitenberger, Heidenheim (DE); Guenter Grupp, Boehmenkirch (DE); Oliver Jacobs, Koenigsbronn (DE); Carsten Wuerfel, Oberkochen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 343 days.

(21) Appl. No.: 15/591,526

(22) Filed: May 10, 2017

(65) Prior Publication Data
US 2017/0241760 A1 Aug. 24, 2017

Related U.S. Application Data

(63) Continuation of application No. PCT/EP2015/077366, filed on Nov. 23, 2015.

(30) Foreign Application Priority Data

Nov. 25, 2014 (DE) .......................... 10 2014 117 244

(51) Int. Cl.
*G01B 5/004* (2006.01)
*G01B 5/00* (2006.01)
(Continued)

(52) U.S. Cl.
CPC .......... *G01B 5/0016* (2013.01); *G01B 5/0004* (2013.01); *G01B 5/008* (2013.01); *G01B 21/045* (2013.01)

(58) Field of Classification Search
CPC ....................................................... G01B 5/004
(Continued)

(56) References Cited

U.S. PATENT DOCUMENTS 4,964,221 A * 10/1990 Breyer ................. G01B 5/0016
33/1 M
5,251,156 A * 10/1993 Heier ................... G01B 11/005
33/503
(Continued)

FOREIGN PATENT DOCUMENTS

DE 37 11 455 A1 1/1988
DE 38 08 871 A1 9/1989
(Continued)

OTHER PUBLICATIONS

English translation of International Preliminary Report on Patentability (Chapter 1); for PCT/EP2015/077366; dated Jun. 8, 2017; 8 pp.
(Continued)

*Primary Examiner* — George B Bennett
(74) *Attorney, Agent, or Firm* — Harness, Dickey & Pierce, P.L.C.

(57) ABSTRACT

The present invention relates to a coordinate measuring machine with a measuring system for measuring a workpiece, a carrier structure for carrying the measuring system and a base plate for supporting the workpiece. The carrier structure is movably guided in at least one direction on the base plate. The coordinate measuring machine also has a first support system with at least three supports for supporting the base plate, a second support system and a control
(Continued)

device for controlling the second support system dependent on a force application to the first support system. The present invention also relates to a method for compensating for large workpiece masses on a coordinate measuring machine.

24 Claims, 5 Drawing Sheets

(51) Int. Cl.
  *G01B 21/04* (2006.01)
  *G01B 5/008* (2006.01)
(58) Field of Classification Search
  USPC .......................................................... 33/503
  See application file for complete search history.

(56) References Cited

U.S. PATENT DOCUMENTS

| | | | |
|---|---|---|---|
| 6,123,312 A | 9/2000 | Dai | |
| 6,430,828 B1* | 8/2002 | Ulbrich | G01B 7/012 33/503 |
| 2009/0271997 A1* | 11/2009 | Ruck | G01B 5/008 33/503 |
| 2010/0250178 A1* | 9/2010 | Noda | G01B 5/008 702/95 |
| 2016/0069677 A1* | 3/2016 | Garvey | G01B 21/04 33/503 |
| 2016/0138901 A1* | 5/2016 | Koshiishi | G01B 5/004 33/520 |
| 2017/0089684 A1* | 3/2017 | Grupp | G01B 21/04 |

FOREIGN PATENT DOCUMENTS

| | | |
|---|---|---|
| DE | 38 14 181 A1 | 11/1989 |
| DE | 196 36 102 A1 | 3/1998 |
| DE | 197 20 049 A1 | 11/1998 |
| DE | 101 20 733 A1 | 10/2002 |
| DE | 102 29 823 A1 | 1/2004 |
| DE | 20 2014 103 144 U1 | 8/2014 |
| WO | 2012/155282 A2 | 11/2012 |

OTHER PUBLICATIONS

German language Examination Report (English translation included) for DE 10 2014 117 244.2; dated Aug. 6, 2015; 14 pp.
International Search Report for PCT/EP2015/077366; dated Jan. 22, 2016; 11 pp.

* cited by examiner

COORDINATE MEASURING MACHINE AND METHOD FOR COMPENSATING FOR LARGE WORKPIECE MASSES

CROSS-REFERENCE TO RELATED APPLICATIONS

This is a continuation application of International patent application PCT/EP2015/077366, filed Nov. 23, 2015, which claims the priority of German patent application DE 10 2014 117 244.2, filed Nov. 25, 2014. The contents of both priority applications are incorporated herein by reference.

BACKGROUND OF THE INVENTION

The present invention relates to a coordinate measuring machine with a measuring system for measuring a workpiece, a carrier structure for carrying the measuring system, and a base plate for supporting the workpiece, wherein the carrier structure is movably guided at least in one direction on the base plate, and wherein the coordinate measuring machine also has a first support system with at least three supports for supporting the base plate.

The present invention also relates to a method for compensating for large workpiece masses on a coordinate measuring machine.

A coordinate measuring machine is for example shown in document DE 102 29 823 A1.

Coordinate measuring machines are generally known in the prior art. They serve the purpose of determining coordinates of workpieces with high precision. In this way, for example, individual points, point paths, dimensions and/or forms of the workpiece can be determined or checked with high precision. Such coordinate measuring machines are used for example in quality assurance or in areas of activity such as "reverse engineering".

In the case of coordinate measuring machines, a measuring system, for example a measuring system operating on a tactile and/or optical basis, is coupled to a carrier structure, which makes it possible for the measuring system to be moved and aligned within a measuring space. Very many different types of carrier structures are known in principle, for example gantry constructions, horizontal-arm systems, table measuring devices and all other types of robot-assisted measuring systems, to name just a few examples. The carrier structure is in this case generally arranged on a base plate, in relation to which the carrier structure is relatively movable. Then, the workpiece to be measured is also arranged on the base plate.

The high-precision measuring requirements require a horizontal alignment of the base plate and retention of this alignment during a measuring operation. This means not only a possible damping of vibrations occurring, but also compensation for changing forces of weight applied to the base plate. Such changing of the forces of weight applied may be caused for example by placing on a workpiece or else by moving the carrier structure in relation to the base plate.

The document DE 38 088 71 A1 proposes a coordinate measuring machine that is produced in a welded-steel construction and has a compact base frame with welded-in and hardened guides and also a measuring table plate welded into the base frame. The entire base frame is intended to rest on a total of four air spring elements.

A dynamic inclination correction has also been proposed for coordinate measuring machines, in the form of a method for determining at least one coordinate of a structure in the measuring volume of a coordinate measuring machine mounted on supports with variable inclination, which comprises the steps of determining a measured value for the at least one coordinate, determining a value for the inclination of the coordinate measuring machine and correcting the measured value for the at least one coordinate in dependence on the determined value for the inclination of the coordinate measuring machine. By controlling the supports, formed as air springs, in a control circuit, it is intended that an inclination of the coordinate measuring machine is reduced.

Nowadays, support systems for coordinate measuring machines are generally designed as a three-point bearing system or reduced four-point bearing system with three or four air spring elements. The base plates are in most cases made of granite. For example, coordinate measuring machines of a gantry construction may nowadays be designed with large dimensions, which also makes the measuring of large workpieces possible. Large dimensions of the workpieces are also accompanied by correspondingly high masses and weight forces, which may well lie in the range of one to several tonnes. If at least one guide for the carrier structure of the measuring system is provided directly on the base plate, undesired measuring deviations may occur when measuring such workpieces with high masses and consequently resultant high weight forces on the base plate.

It is therefore an object of the present invention to provide a coordinate system that has an improved support system.

SUMMARY OF THE INVENTION

According to one aspect of the invention, therefore, a coordinate measuring machine with a measuring system for measuring a workpiece, a carrier structure for carrying the measuring system and a base plate for supporting the workpiece is proposed, wherein the carrier structure is movably guided at least in one direction on the base plate, and wherein the coordinate measuring machine also has a first support system with at least three supports for supporting the base plate, and wherein the coordinate measuring machine also has a second support system and a control device for controlling the second support system dependent on a force application to the first support system.

The control device is consequently designed in such a way that it controls the second support system dependent on a force application to the first support system. The wording "dependent on a force application to the first support system" does not necessarily mean a direct dependence on a force application. There is consequently no need for a direct measurement of the force application and input into the control device of a variable representing a force. An indirect dependence on the force application is also comprised. A variable indirectly representing the force application, for example a pressure, a deformation or a movement, may also be input into the control device.

It has been found that workpieces with large workpiece masses cause great weight forces to be applied to the base plate, resulting in a deformation of the base plate. Since at least one guide of the carrier structure is arranged directly on the base plate, these deformations are transmitted directly to the corresponding guide. This results in turn in deviations in guidance, which are ultimately reflected in measuring deviations or measuring errors on the coordinate measuring machine.

It is therefore proposed to provide a second support system, which is controlled by a control device. The force applied to the first support system is picked up by the control device. This force applied indicates high workpiece masses and possible moments applied as a result of arranging the workpiece on the base plate. The control device can then compensate for the influence of a large workpiece mass, at least with respect to the weight forces, by means of the second support system controlled by it. With a corresponding refinement of the second support system likewise as a three-point bearing system, it is possible to compensate particularly well for high weight forces being applied as a result of large workpiece masses. With a refinement of the second support system with four supports, wherein each support is individually or separately controllable in a closed-loop manner, it is additionally possible to compensate likewise for moments induced by the workpiece. This provides a successful way of determining high weight forces applied to the first support system as a result of large workpiece masses, and any moments applied, and intervening in a controlled assisting and compensating manner by means of the second support system. In this way deformations of the base plate and resultant deviations in guidance and measuring errors can be avoided.

According to a further aspect of the invention, a method for compensating for large workpiece masses on a coordinate measuring machine with a measuring system for measuring a workpiece, a carrier structure for carrying the measuring system and a base plate for supporting the workpiece is proposed, wherein the carrier structure is movably guided at least in one direction on the base plate, and wherein the coordinate measuring machine also has a first support system with at least three supports for supporting the base plate, a second support system and a control device for controlling the second support system dependent on a force application to the first support system, and wherein the method comprises the steps of calibrating a reference state of the base plate by means of the first support system, arranging on the base plate a workpiece to be measured by means of the coordinate measuring machine, determining variables that represent the forces applied to the at least three supports of the first support system by the workpiece, and controlling the second support system by means of the control device in such a way that the reference state is restored.

In this way it is possible to compensate by means of the second support system for the forces and moments applied by the workpiece. The reference state of the coordinate measuring machine arranged without the workpiece is calibrated at the outset. For example, in the case where the first support system is provided by means of air springs, in particular mechanically controlled air springs, the pressures prevailing in the air springs in the reference state may be determined. The reference state has in particular a horizontally aligned base plate. Loading by means of a large workpiece mass inevitably leads to an increase in pressure in the supports of the first support system configured as air springs. This deviation from the reference state can be determined and compensated by means of the second support system in such a way that the pressure states of the reference state are restored in the air springs of the first support system. High weight forces of the workpiece are consequently additionally taken up by the second support system and moments applied are compensated. Also in this way, deformations of the base plate and resultant deviations in guidance and measuring errors are avoided.

It may be provided in one refinement of the coordinate measuring machine that the at least three supports of the first support system are respectively formed by a main air spring device.

In this way, the at least three supports of the first support system are respectively formed by one or at least one air spring. The term "main air spring device" in this case presupposes that an "air spring device" may have at least one air spring, but in particular also a number of air springs. The term "main air spring device" has been chosen here merely to differentiate terminologically between the air spring devices of the first support system and the "secondary air spring devices" of the second support system. The words "main" and "secondary" do not have any further significance. In this way, a three-point bearing system or for example a reduced four-point bearing system is provided by means of air springs as the first support system. It goes without saying that other damping and/or spring systems are also conceivable in principle for the first support system, for example hydraulic springs, mechanical systems such as spindles or levelling shoes.

It may be provided in a further refinement of the coordinate measuring machine that the first support system has at least three control valve arrangements for controlling the at least three main air spring devices, in particular wherein the at least three control valve devices are in each case a mechanical control valve arrangement.

In this way it is provided that the first support system attempts for example to retain an initially calibrated basic horizontal alignment of the base plate. In particular in the case of a mechanical control valve arrangement, it is possible here to implement an automatic control, in which, although an increased force applied would result in an increase in the air spring pressure, the positioning and horizontal alignment can be retained. In this way, the relative positioning of the at least three support points of the first support system can be retained.

It may be provided in a further refinement of the coordinate measuring machine that the first support system has four main air spring devices, wherein a first and a fourth main air spring device are assigned a shared first control valve arrangement, wherein a second main air spring device is assigned a second control valve arrangement, and wherein a third main air spring device is assigned a third control valve arrangement.

In this way, a reduced four-point bearing system is provided. Combining the first and fourth main air spring devices makes it possible to avoid an over-determination of the system. The first and fourth main air spring devices are jointly controlled. At the same time, a more secure support of the base plate is provided.

It may be provided in a further refinement of the coordinate measuring machine that the first support system has at least three force application sensors for determining a variable that represents a force applied to at least one support, in particular wherein the determined variable is an air pressure.

In this way it is possible to determine a force applied to the first support system. This may take place for example by a direct determination of the force, but for example also by indirect determining. Indirect determining can be realized for example by means of displacement pickups, for example strain gages or moving coils. Preferably, an air pressure that can be used to conclude the force applied is determined in a main air spring device. The forces applied can in turn be used to conclude the workpiece mass and then a decision can be made in the control device as to the necessity for providing assistance by the second support system, and if so what kind of assistance.

It may be provided in a further refinement of the coordinate measuring machine that each control valve arrangement of the first support system is assigned a sensor.

In this way a dedicated control circuit for each control valve arrangement can be closed by means of the corresponding sensor.

It may be provided in a further refinement of the coordinate measuring machine that the second support system has at least one secondary air spring device, which forms a support of the second support system.

Also in the second support system, therefore, the support or supports of the second support system may be respectively provided by an air spring device, wherein each air spring device may have one or more air spring elements. Here, too, other types of supports are conceivable in principle, as long as they can be controlled by means of a control device, in particular can be controlled in their height. For example, here, too, hydraulic supports or mechanically controllable supports are conceivable, such as for example levelling shoes or else spindle devices.

It may be provided in a further refinement of the coordinate measuring machine that the second support system has at least three supports, and wherein each support is formed by a secondary air spring device.

In this way, the second support system is also provided as a three-point bearing system or for example as a reduced four-point bearing system, so that the second support system is also definitely determined, and furthermore inclinations or moments caused by the second support system can be compensated by corresponding control.

It may be provided in a further refinement of the coordinate measuring machine that the second support system has at least three control valve arrangements for controlling the at least three secondary air spring devices, in particular wherein the at least three control valve arrangements are in each case an electronic control valve arrangement.

Also in this way a dedicated control circuit with an associated control valve arrangement can be provided for each secondary air spring device. In particular, each control valve arrangement is provided as an electronic control valve arrangement, which can then be activated by the control device.

It may be provided in a further refinement of the coordinate measuring machine that the second support system has four secondary air spring devices, wherein a first and a fourth secondary air spring device are assigned a shared first control valve arrangement, wherein a second secondary air spring device is assigned a second control valve arrangement, and wherein a third secondary air spring device is assigned a third control valve arrangement.

In this way, a reduced four-point bearing system can also be provided for the second support system. In this way it is possible in particular to compensate for high weight forces by the second support system. In particular in connection with a correspondingly configured first support system, which is for example likewise configured as a reduced four-point bearing system, effective compensation can be provided in this way, since for example a respective main air spring device can be assigned a corresponding secondary air spring device.

It may be provided in a further refinement of the coordinate measuring machine that the second support system has at least four secondary air spring devices, wherein the coordinate measuring machine also has a number of control valve arrangements corresponding to the number of secondary air spring devices, and each control valve arrangement is assigned to precisely one secondary air spring device.

In this way it is possible for the second support system also to be provided as a genuine four-point bearing system, in which each of the secondary air spring devices is separately controllable in a closed-loop or open-loop manner. In this way it is possible to compensate for high weight forces and also moments by the second support system. Also in connection with a first support system, which is for example likewise configured as a reduced four-point bearing system, effective compensation can be provided in this way. For example, the second support system may have four secondary air spring devices, wherein a first secondary air spring device is assigned a first control valve arrangement, wherein a second secondary air spring device is assigned a second control valve arrangement, wherein a third secondary air spring device is assigned a third control valve arrangement, and wherein a fourth secondary air spring device is assigned a fourth control valve arrangement. In particular, four secondary air spring devices may be arranged in such a way that they are arranged at the corner points of a rectangle, in particular an imaginary rectangle. This makes simple compensation for moments possible on the basis of two axes that are perpendicular to one another.

It may be provided in a further refinement of the coordinate measuring machine that a number of supports of the first support system corresponds to a number of supports of the second support system, and wherein a number of control valve arrangements of the first support system corresponds to a number of control valve arrangements of the second support system, and wherein a number of control valve arrangements of the first support system corresponds to a number of force application sensors for determining a variable that represents a force applied to at least one support of the first support system.

In this way, the first support system and the second support system are provided in a corresponding refinement. This makes it possible to keep the compensation for the force applied to the first support system by the second support system simple in terms of technical control aspects.

It may be provided in a further refinement of the coordinate measuring machine that the supports of the second support system are arranged between the supports of the first support system on the base plate.

As described at the outset, it is intended in particular to avoid bending of the base plate caused by high weight forces of the workpiece. This bending will occur in particular between the supports of the first support system if they are spaced relatively far apart from one another. It is therefore advantageous in particular to arrange the support of the second support system between the supports of the first support system in order to compensate for these instances of bending. In this case, the term "between" should not necessarily be understood as meaning that a support of the second support system must be arranged on a straight line between two supports of the first support system, but rather that the supports of the second support system should be arranged within a region, or a region enclosed by the supports of the first support system.

It may be provided in a further refinement of the coordinate measuring machine that the supports of the first support system create a supporting area on the base plate, wherein the supports of the second support system are arranged within the supporting area on the base plate.

As stated above, a supporting area created by the support of the first support system may be defined on the base plate. The supports of the second support system should then preferably be arranged on the base plate within this supporting area. In this way, instances of bending of the base plate can be effectively avoided.

It may be provided in a further refinement of the coordinate measuring machine that the base plate has a geometrical center, and wherein a greatest distance of a support of the second support system from the geometrical center is less than a smallest distance of a support of the first support system from the geometrical center.

In this case, the base plate is usually configured as a rectangular plate, so that the geometrical center lies at the point of intersection of the two diagonals of the base plate. In order to avoid deformations of the base plate, it is advantageous to arrange the second support system or the supports thereof closer to the geometrical center than the supports of the first support system. This also serves the purpose of avoiding deformations caused by high weight forces.

It may be provided in a further refinement of the coordinate measuring machine that an area enclosed by the supports of the second support system includes a geometrical center of the base plate, in particular wherein the area enclosed by the supports of the second support system corresponds to between 20% and 40% of the size of an area enclosed by the supports of the first support system.

Strictly speaking, the geometrical center of the base plate lies in the interior of the base plate, since it has a certain thickness. By contrast, the area enclosed by the supports of the second support system lies on a surface of the base plate. In this sense, the "inclusion" of the geometrical center is intended to mean that the perpendicular projection of the geometrical center onto this surface of the base plate means, which the supports of the second support system or of the first support system are arranged. The second support system is therefore arranged close to this geometrical center and encloses a small area in comparison with the area of the first support system. This may likewise preferably serve the purpose of effectively avoiding deformation of the base plate between the supports of the first support system.

It may be provided in a further refinement of the coordinate measuring machine that the carrier structure is a gantry construction, in particular wherein the gantry construction has a gantry movably guided in a first direction on the base plate, a carriage movably guided in a second direction, perpendicular to the first direction, on the gantry and a quill movably guided in a third direction, perpendicular to the first and second directions, on the carriage.

In this way, the carrier structure has a customary gantry construction with a gantry, a carriage and a quill. This makes it possible for a measuring system to be movable in three dimensions in the measuring space. In particular in the case of this type of carrier structure, deviations in guidance and measuring inaccuracies can be avoided particularly effectively since the gantry is guided directly on the base plate.

It may be provided in a further refinement of the proposed method that, before the controlling step and after the determining step, it is established that the forces applied by the workpiece to the at least three supports of the first support system lie above a predetermined threshold value.

In this way it may be provided that the second support system only becomes "active" and is controlled if it is established that a workpiece with a large mass and resultant very high weight forces is actually arranged on the coordinate measuring machine.

It is understood that the aforementioned features and those yet to be explained below may be used not only in the respectively specified combination but also in other combinations or on their own, without departing from the scope of the present invention.

BRIEF DESCRIPTION OF THE SEVERAL VIEWS OF THE DRAWING

Embodiments of the invention are shown in the drawing and explained in more detail in the following description. In the figures.

DETAILED DESCRIPTION OF THE PREFERRED EMBODIMENTS OF THE INVENTION

Figure 1:
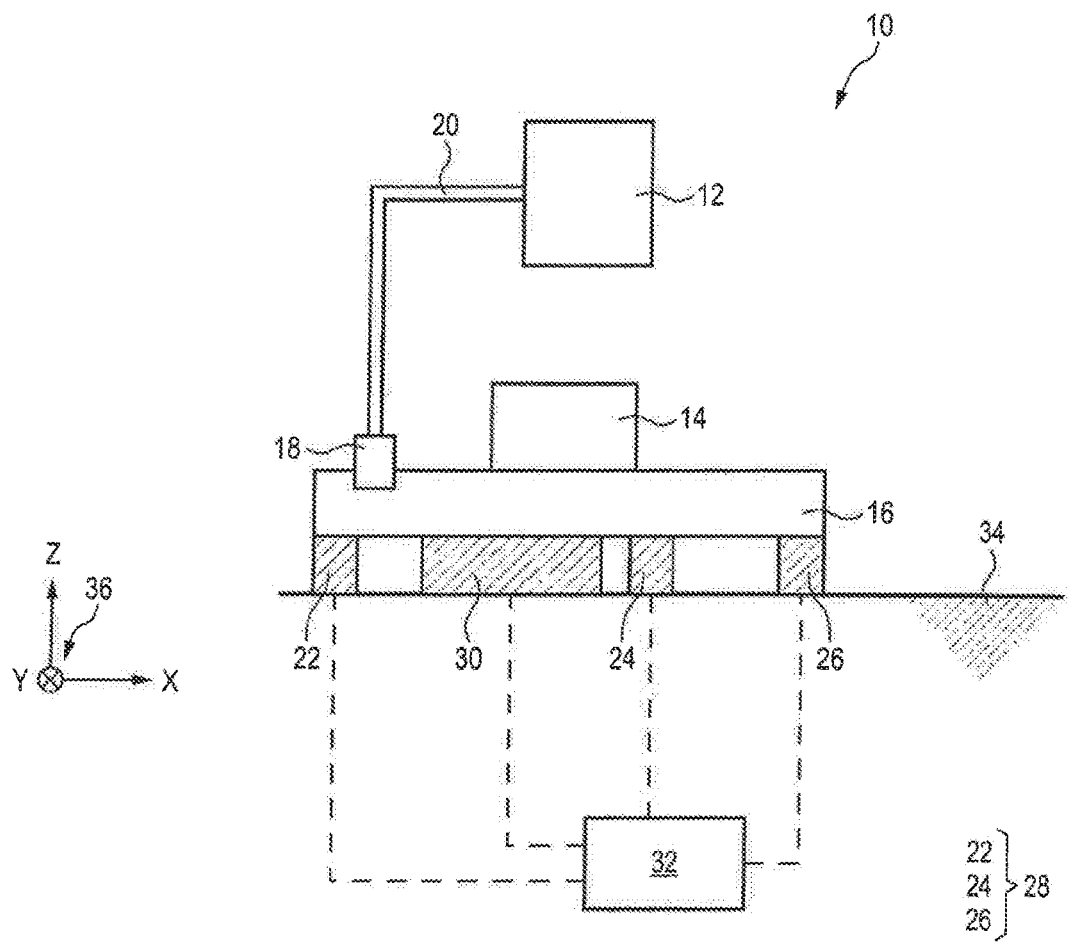
FIG. 1 shows a schematic view of an embodiment of a coordinate measuring machine.

FIG. 1 shows a coordinate measuring machine 10 according to one embodiment. The coordinate measuring machine has a measuring system 12, which may for example have an optical sensor and/or a tactile sensor. The measuring system 12 serves for measuring coordinates of a workpiece 14. The workpiece 14 is arranged on a base plate 16 of the coordinate measuring machine 10.

Provided on the base plate 10 is a guide 18, to which a carrier structure 20 is coupled. Likewise coupled to the carrier structure 20 is the measuring system 12, which in this way can be moved spatially. In the embodiment shown, the guide 18 serves for example for a movement in the Y direction, so that, by movement of the carrier structure 20, the measuring system 12 can likewise be moved in the Y direction.

The coordinate measuring machine 10 has a first support system 28, which in the embodiment shown has three supports 22, 24 and 26, so that there is a definite three-point bearing of the coordinate measuring machine 10 on a base 34. In order to avoid instances of bending of the base plate 16 caused by high mass of the workpiece 14, a second support system is also schematically shown and denoted by the reference sign 30. The coordinate measuring machine 10 also has a control device 32, which controls the second support system 30. The forces applied to the supports 22, 24, 26 of the first support system 28 are determined at least indirectly in the form of a variable representing the corresponding force and are input into the control device 32. In this case, a variable representing the force that is correspondingly applied to the respective support 22, 24, 26 may be determined at each support 22, 24, 26 and input into the control device. The variable may be for example the force directly, but also an indirect variable. For example in the case where the supports 22, 24, 26 are formed as air springs, this may take place in the form of a measured pressure.

The arrangement of the supports 22, 24, 26 should be understood as merely by way of example and also takes place for example offset in the Y direction, i.e. perpendicularly to the plane of the drawing, in order to make possible a corresponding bearing of the base plate likewise extending in the Y direction perpendicular to the plane of the drawing, in particular a rectangular base plate 16. As a consequence of this, also merely the arrangement of the second support system 30 should be understood merely schematically. The second support system may have at least one support, in particular at least three supports. In this way it is possible in the case of correspondingly high weight forces applied to the supports 22, 24, 26 of the first support system 28 to determine the weight forces and to initiate an actuation of the second support system 30 by the control device 32 in order to further support the base plate 16 and avoid deformation thereof. Furthermore, moments and inclinations in the base plate 16 that are caused by a possibly unsymmetrical arrangement of the workpiece can be compensated by the second support system 30.

A Cartesian coordinate system 36 illustrates the spatial directions. The base plate 16 extends in the X direction and the Y direction. Running perpendicularly thereto is the Z direction.

Figure 2:
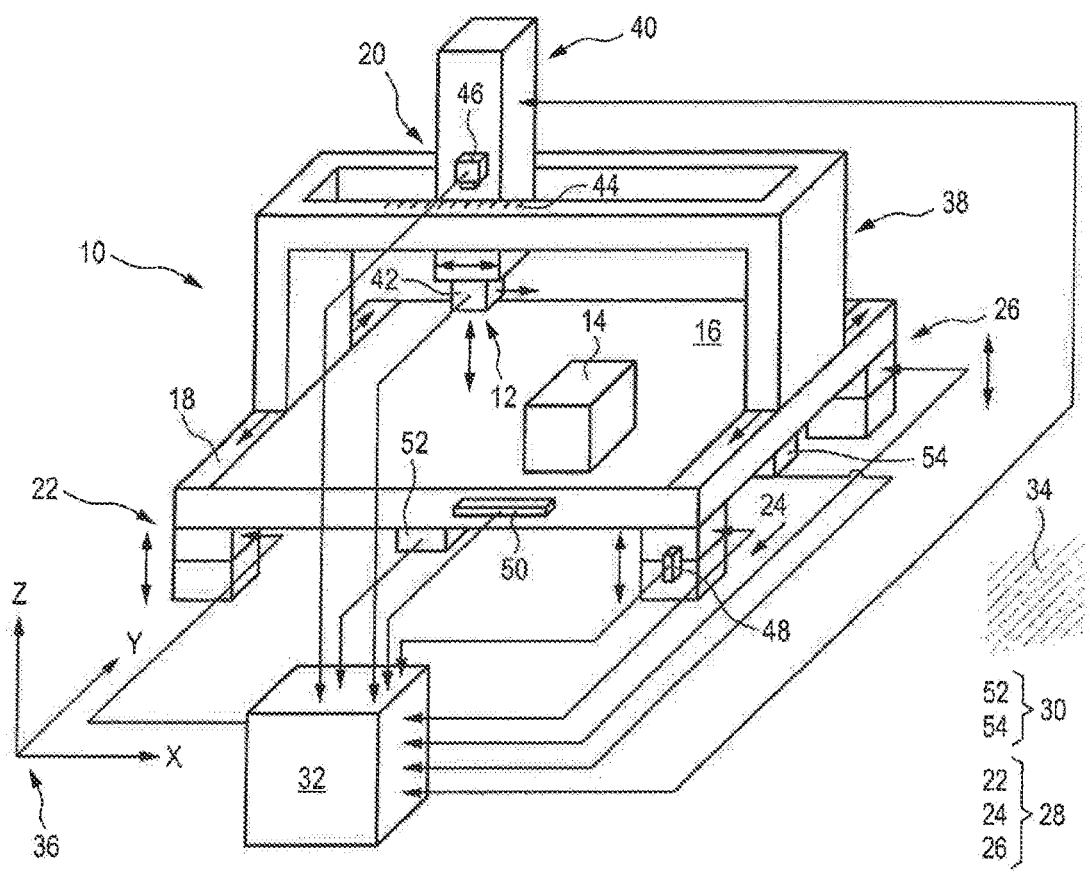
FIG. 2 shows a schematic isometric view of a further embodiment of a coordinate measuring machine.

FIG. 2 shows a further embodiment of a coordinate measuring machine 10. The same elements have been denoted by the same reference signs and are not being explained again below.

The coordinate measuring machine 10 of FIG. 2 has a gantry construction as a carrier structure 20. The carrier structure therefore comprises a gantry 38, which is movable relative to the base plate 16 in the Y direction along a guide 18. The mobility is indicated by corresponding arrows. A carriage 40 is movable in relation to the gantry 38 in the X direction. This mobility is also schematically indicated by arrows. A quill 42 is in turn arranged movably in the Z direction in the carriage 40. Arranged on the quill is the measuring system 12. In this way, the measuring system 12 is movable in relation to the base plate 16 in all three spatial directions X, Y and Z by means of the carrier structure 20. Arranged on the base plate 16 is likewise the workpiece 14.

Provided for determining the position of the gantry, the carriage and the quill are scales and corresponding displacement pickups, which are connected to the control device 32 and input corresponding values into the latter. Only a scale 44 and a displacement pickup 46, which may serve for determining a position of the carriage 40 with respect to the gantry 38, are schematically illustrated. Corresponding further scales and displacement pickups for determining the position of the gantry in relation to the base plate 16 or of the quill 42 in relation to the carriage 40 are not shown for reasons of overall clarity.

Also schematically shown is a force application sensor 48, which serves for determining a variable representing a force. In the embodiment shown, the supports 22, 24 and 26 of the first support system 28 are designed as air spring devices. These have in each case at least one air spring. In particular, the supports of the first support system have mechanical-pneumatic control valves. These will be briefly explained below. For example, in this case the force application sensor may be designed as a pressure sensor, which measures the pressure within the respective spring element. The pressure occurring can be used to conclude the force applied to the spring element. It goes without saying that corresponding force application sensors may also be provided on the supports 22 and 26. To this extent, the base plate 16 is supported on the base 34 by means of the first support system 28.

It is possible in principle that, in addition to the force application sensors 48, there may also be provided for example an inclination sensor 50, which directly determines an inclination of the base plate 16. In addition or as an alternative to such an inclination sensor 50, there may also be provided on the base plate 16 displacement pickups (not shown), which determine a lowering of the base plate 16 at certain points, in particular at or near the supports 22, 24, 26. In this way, an inclination of the base plate 16 may be determined and possibly compensated, possibly redundantly.

Also schematically represented are two supports 52, 54 of the second support system 30. As will be explained below, the second support system 30 may in principle also have a third support and a fourth support, which are not shown however in FIG. 2 for reasons of the view. The same applies to the first support system 28, which may also have a fourth support.

In the case of a very large mass of the workpiece 14, it may happen that the base plate 16 is deformed. Such large workpiece masses, with which there is a risk of deformation of the base plate 16, may be determined by means of the force application sensor or sensors 48. Then the second support system 30 may be used to compensate for such a deformation by means of the control device. It is preferable in this case, as can be seen in FIG. 2 and as will be explained in more detail below in connection with FIG. 4, that the second support system 30 is arranged between the supports 22, 24, 26 of the first support system 28. A large mass of the workpiece 14 will primarily lead to bending between the supports 22, 24 and 26, which can then be compensated by means of the supports 52, 54 of the second support system 30. In the case of an eccentric or unsymmetrical arrangement of the workpiece 14, there may additionally be great loads on the base plate 16 and on the first support system 28 in the form of moments, which can then likewise be compensated by means of the second support system.

In particular, the control by the control device 32 may take place in such a way that a reference state of the first support system 28, calibrated without the workpiece 14, and an associated application of force to the first support system 28 can be restored. The second support system 30 is then consequently intended only to receive the forces applied by the workpiece 14 and compensate for any moments introduced.

Figure 3:
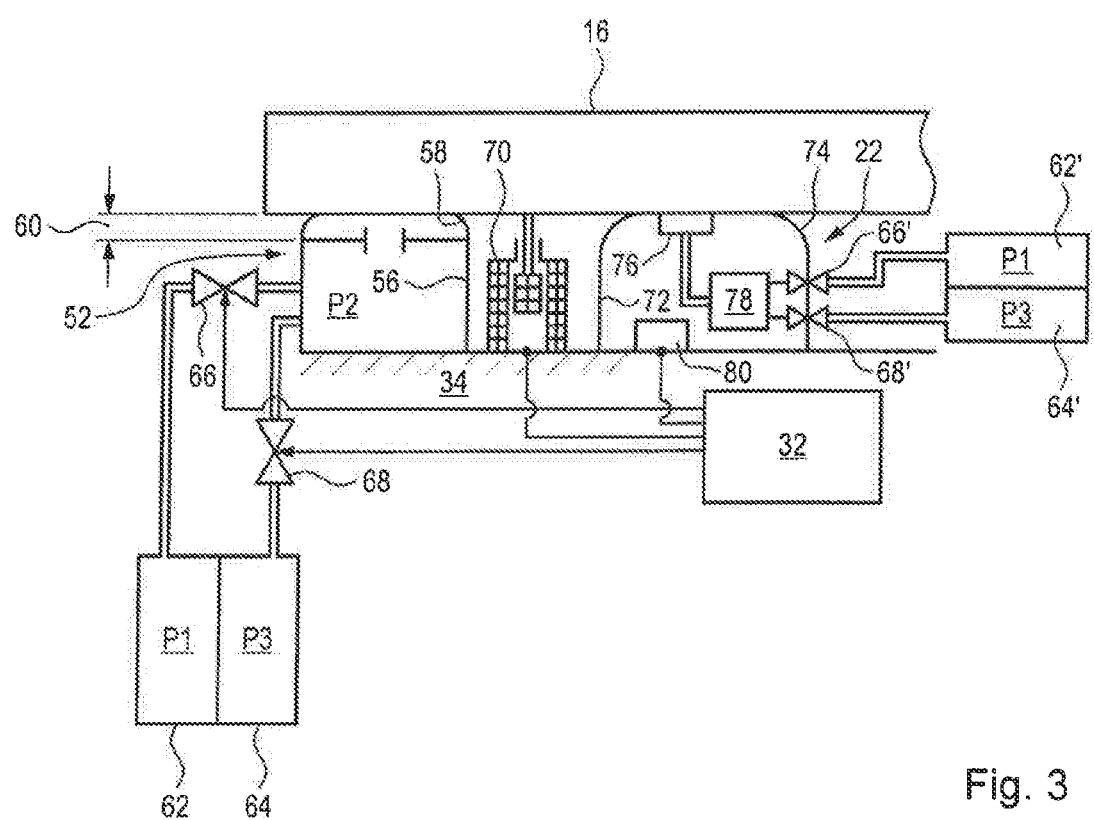
FIG. 3 shows an exemplary schematized representation of supports of the first and second support systems.

FIG. 3 schematically shows a possible structure both of a support with a mechanical control valve arrangement and of a support with an electronic control valve arrangement. This structure is described below merely by way of example on the basis of a single support 22 of a first support system, which has a mechanical control valve arrangement. In the present example, this is assigned a support 52 of the second support system 30, which has an electronic control valve arrangement.

In the embodiment represented, the electronic control valve arrangement 52 has an air spring device with an air spring. The air spring has a main body 56, which is for example formed of metal and is adjoined by a membrane 58, which by corresponding variation of an internal pressure P2 can be made to bulge outward and be varied in its ultimate supporting height 60. In this way, the height of the base plate 16 can be varied at corresponding support points.

Two valves 66, 68 are coupled to the interior space enclosed by the main body 56. These close or open a respective pressure chamber 62, 64. In the pressure chamber 62 there is a pressure P1, which is less than the pressure P2. In the pressure chamber 64 there is a pressure P3, which is greater than the pressure P2. In this way, the pressure P2 within the main body 56 can be varied by electronic switching of the valves 66, 68 by means of the control device 32.

The support 22 of the first support system 28 has a mechanical control valve arrangement. Corresponding pressure chambers 62' and 64' have the pressures P1 and P3. For example, it may well be provided to connect all of the air springs to the same pressure reservoirs. The support 22 likewise has a main body 72, which is coupled to a corresponding membrane 74. However, a plunger 76 that is lowered or raised according to the height of the base plate 16 is provided. Coupled to this plunger 76 is a mechanical kinematic mechanism 68, which is only schematically shown. Depending on the position of the plunger, this mechanism operates a valve 66' or 68'. Consequently, if the plunger 76 is moved out of a calibrated reference position, either the pressure in the interior space of the support 22 is raised or it is lowered. Thus, for example, the return to the once-calibrated reference position can be mechanically provided. Therefore, a pressure in the support can be determined by means of a pressure sensor 80 and can be used indirectly to determine the force acting on the support 22, so that this is available to the control device 32 for controlling the assigned support 52 of the second support system 30.

Also represented by way of example is a displacement pickup 70. This may be additionally provided for determining the position of the base plate 16, in order to determine the position thereof, possibly redundantly, and also to be able in this way possibly to conclude forces applied to the support. Such a displacement pickup may transmit a measure of the deflection of the corresponding support. In particular, a number of such displacement pickups may be arranged on the base plate 16, in order also to determine an inclination of the base plate, likewise redundantly with the aforementioned inclination sensor.

Figure 4:
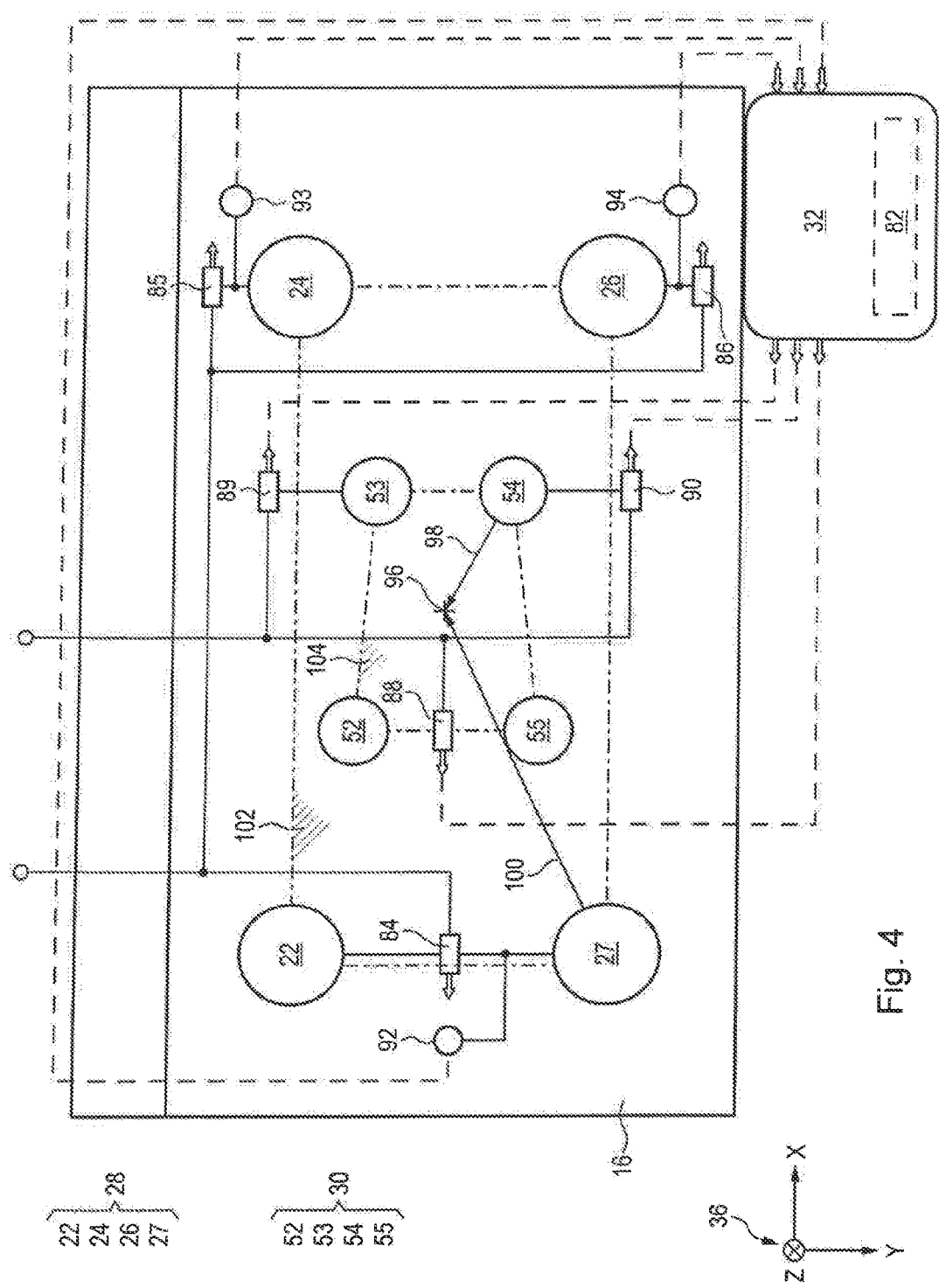
FIG. 4 shows a representation of a possible arrangement of the supports of a first and a second support system, in particular in a coordinate measuring machine as shown in FIG. 2.

FIG. 4 shows a schematic view of the arrangement of the supports 22, 24, 26 and 27 of the first support system 28 and of the supports 52, 53, 54, 55 of the second support system 30 on the base plate 16, in particular the base plate 16 of the coordinate measuring machine in FIG. 2. This is explained by way of example on the basis of a view of the base plate from below, i.e. looking in the positive Z direction.

Shown in FIG. 4 are the base plate 16, the control device 32 and a control application 80 that is possibly provided for controlling the second support system 30 and/or also the first support system 28.

The supports 22, 24, 26 and 27 of the first support system 28 are provided relatively far apart from one another as a reduced four-point bearing system. The first support 22 and the fourth support 27 are controlled by means of a shared control valve arrangement 84. The support 24 is controlled by means of a mechanical control valve arrangement 85 and the support 26 is controlled by means of a mechanical control valve arrangement 86. The first support system formed in this way can be used to retain a once-calibrated horizontal alignment of the base plate 16. A pressure existing in the supports, which represents a measure of the force applied to the supports 22, 24, 26 and 27, can be determined by means of pressure sensors 92, 93 and 94. The pressure sensors enter the measured values into the control device 32.

The deformation of the base plate 16 when there are high workpiece masses would correspondingly occur with preference between the supports. A bending consequently occurs primarily in a space between the supports 22, 24, 26 and 27. A supporting area 102, which the supports 22, 24, 26 and 27 create between themselves, is therefore shown in FIG. 4 and denoted by 102. The second support system 30 is therefore preferably provided within this supporting area 102. The supports 52, 53, 54 and 55 of the second support system 30 therefore lie within the supporting area 102. The supports 52, 53, 54 and 55 are respectively formed as electronically controlled spring devices. They are likewise arranged as a reduced four-point bearing system. An electronic control valve 88 controls the first support 52 and the fourth support 55. An electronic control valve 89 controls the second support 53 and a further electronic control valve 90 controls the third support 54. The supports 22, 24, 26 and 27 therefore respectively form a main air spring device. The supports 52, 53, 54 and 55 respectively form a secondary air spring device.

In an alternative refinement, the supports 52, 53, 54 and 55 may also be formed as a genuine four-point bearing system. An electronic control valve 88 then only controls the first support 52. An electronic control valve 89 controls the second support 53. An electronic control valve 90 controls the third support 54. A further electronic control valve (not shown) then controls the fourth support 55. The fourth support 55 is likewise controlled in a closed-loop or open-loop manner by the control device 32. Thus, a four-point bearing system is provided, in which each support 52, 53, 54 and 55 can be individually or separately controlled in a closed-loop manner. This makes particularly good compensation for moment loads possible.

The secondary air spring devices 52 to 55 also enclose an area between themselves, which is denoted by 104. In particular, this area includes the geometrical center or the perpendicular projection 96 thereof onto the surface of the base plate 16 on which the supports lie. As a result of the arrangement shown, a maximum distance 98 of one of the supports 52 to 55 from this geometrical center 96 is less than a minimum distance of the supports 22, 24, 26, 27 from the geometrical intermediate center 96, which is denoted by 100. The supports 52 to 55 consequently lie within or "between" the supports 22, 24, 26 and 27. The supports 52 to 55 are also arranged closer together around the geometrical center 96, so that the area 104 amounts to 20% to 40% of the supporting area 102, in particular 25%, 30% or 35%, in particular 25% to 35%. In this way it is possible to compensate for the deformation of the base plate 16 occurring between the supports 22, 24, 26 and 27 of the first support system 28 when there are high workpiece masses, in particular in the vicinity of the geometrical center 96, by means of the second support system 30, by corresponding control by means of the control device 32.

Figure 5:
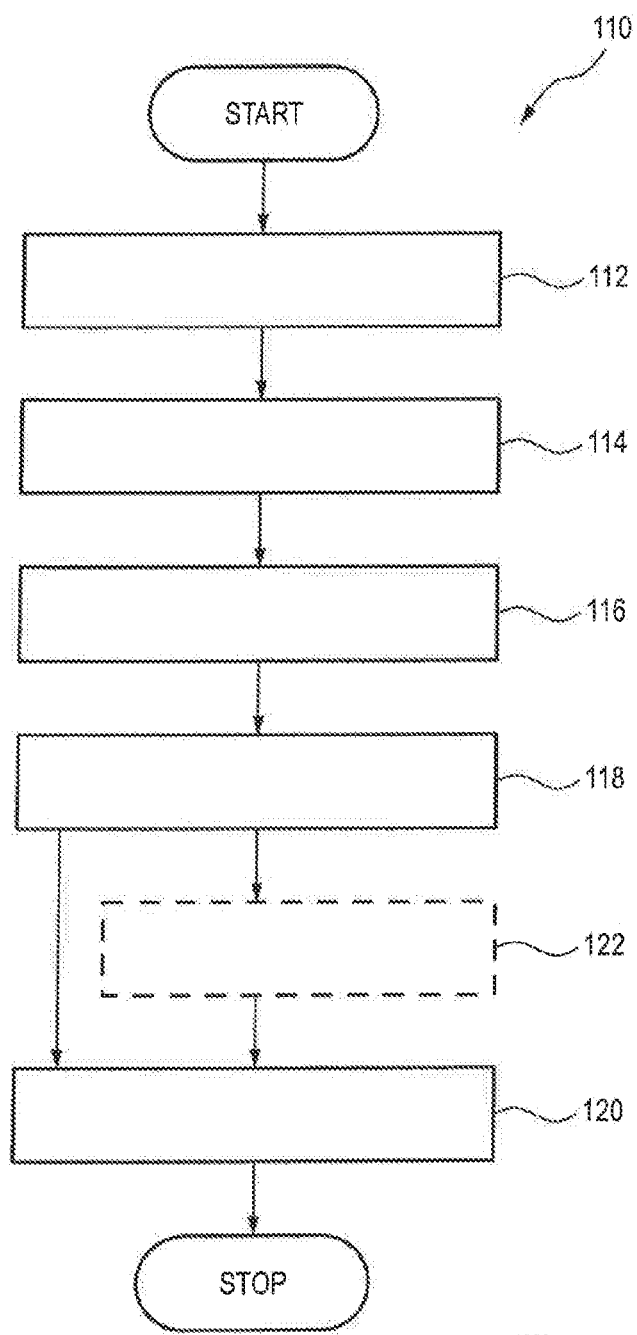
FIG. 5 shows an embodiment of a method for compensating for large workpiece masses on a coordinate measuring machine.

FIG. 5 shows an embodiment of a method 110 for compensating for large workpiece masses.

In particular, in a step 112, there may first be provided a coordinate measuring machine with a measuring system for measuring a workpiece, which also has a carrier structure for carrying the measuring system and a base plate for supporting the workpiece, wherein the carrier structure is movably guided in at least one direction on the base plate, and wherein the coordinate measuring machine also has a first support system with at least three supports for supporting the base plate, a second support system and a control device for controlling the second support system on the basis of a force applied to the first support system.

There is a step of calibrating 114 a reference state of the base plate 16 by means of the first support system 28. This reference state may for example comprise an inclination or horizontal alignment and/or an application of force or an existing pressure in the main spring devices 22, 24, 26, 27 of the first support system 28. In particular, the variable representing a force applied to the first support system form this reference state.

There is then a step of arranging 116 a workpiece 14 to be measured by means of the coordinate measuring machine 10 on the base plate 16.

As a consequence of this, the reference state no longer applies to the first support system. In particular, the pressures applied vary as a result of the higher force application of weight; the mechanical control valve arrangements in the supports 22, 24, 26 and 27 set other, higher pressures. There is possibly also an inclination of the base plate 16.

There is therefore a step of determining 118 variables that represent the forces applied by the workpiece 14 to the at least three supports 22, 24, 26, 27 of the first support system 28.

There is then a controlling 120 of the second support system 30 by means of the control device 32, so that the reference state is restored. This comprises in particular the restoration of the pressures applied in the supports 22, 24, 26, 27 or the main air spring devices and of the first support system 28. This ensures that the force of the weight applied by the workpiece 14 is determined by the second support system 30. Also a possibly existing inclination or a moment in the base plate 16 can be determined by the second support system 30. Preferably an arrangement such as in FIG. 4 is provided for carrying out the method, so that a compensation for applied weight forces and induced moments and inclinations by the workpiece 14 can be completely compensated.

In principle, in one embodiment, before carrying out the controlling step 120 and after the determining step 118, there may be a step 122, in which it is established that the forces applied by the workpiece to the at least three supports of the first support system 28 lie above a predetermined threshold value. In this way it is ensured that the additional control by the second support system 30 is not switched off in the case of every workpiece 14, but only whenever there are particularly high workpiece masses, and consequently there is the probability of deformation of the base plate 16, which necessitates additional support, and possibly necessary compensation for moments and inclinations, of the base plate 16 by the second support system 30.

What is claimed is:

1. A coordinate measuring machine, with a measuring system for measuring a workpiece, a carrier structure for carrying the measuring system and a base plate for supporting the workpiece, wherein the carrier structure is movably guided in at least one direction on the base plate, and wherein the coordinate measuring machine also has a first support system with at least three supports for supporting the base plate, wherein the coordinate measuring machine also has a second support system and a control device for controlling the second support system dependent on a force application to the first support system.

2. The coordinate measuring machine as claimed in claim 1, wherein the at least three supports of the first support system are respectively formed by a main air spring device.

3. The coordinate measuring machine as claimed in claim 2, wherein the first support system has at least three control valve arrangements for controlling the at least three main air spring devices.

4. The coordinate measuring machine as claimed in claim 3, wherein the at least three control valve arrangements are in each case a mechanical control valve arrangement.

5. The coordinate measuring machine as claimed in claim 1, wherein the first support system has four main air spring devices wherein a first and a fourth main air spring device are assigned a shared first control valve arrangement, wherein a second main air spring device is assigned a second control valve arrangement, and wherein a third main air spring device is assigned a third control valve arrangement.

6. The coordinate measuring machine as claimed in claim 1, wherein the first support system has at least three force application sensors for determining a variable that represents a force applied to at least one support.

7. The coordinate measuring machine as claimed in claim 6, wherein the determined variable is an air pressure.

8. The coordinate measuring machine as claimed in claim 6, wherein each control valve arrangement of the first support system is assigned a force application sensor.

9. The coordinate measuring machine as claimed in claim 1, wherein the second support system has at least one secondary air spring device, which forms a support of the second support system.

10. The coordinate measuring machine as claimed in claim 1, wherein the second support system has at least three supports, and wherein each support is formed by a secondary air spring device.

11. The coordinate measuring machine as claimed in claim 10, wherein the second support system has at least three control valve arrangements for controlling the at least three secondary air spring devices.

12. The coordinate measuring machine as claimed in claim 11, wherein the at least three control valve arrangements are in each case an electronic control valve arrangement.

13. The coordinate measuring machine as claimed in claim 1, wherein the second support system has four secondary air spring devices, wherein a first and a fourth secondary air spring device are assigned a shared first control valve arrangement, wherein a second secondary air spring device is assigned a second control valve arrangement, and wherein a third secondary air spring device is assigned a third control valve arrangement.

14. The coordinate measuring machine as claimed in claim 1, wherein the second support system has at least four secondary air spring devices, wherein the coordinate measuring machine also has a number of control valve arrangements corresponding to the number of secondary air spring devices, and each control valve arrangement is assigned to precisely one secondary air spring device.

15. The coordinate measuring machine as claimed in claim 1, wherein a number of supports of the first support system corresponds to a number of supports of the second support system, and wherein a number of control valve arrangements of the first support system corresponds to a number of control valve arrangements of the second support system, and wherein a number of control valve arrangements of the first support system corresponds to a number of force application sensors for determining a variable that represents a force applied to at least one support of the first support system.

16. The coordinate measuring machine as claimed in claim 1, wherein the supports of the second support system are arranged between the supports of the first support system on the base plate.

17. The coordinate measuring machine as claimed in claim 1, wherein the supports of the first support system create a supporting area on the base plate, wherein the supports of the second support system are arranged within the supporting area on the base plate.

18. The coordinate measuring machine as claimed in claim 1, wherein the base plate has a geometrical center, and wherein a greatest distance of a support of the second support system from the geometrical center is less than a smallest distance of a support of the first support system from the geometrical center.

19. The coordinate measuring machine as claimed in claim 1, wherein an area enclosed by the supports of the second support system includes a geometrical center of the base plate.

20. The coordinate measuring machine as claimed in claim 19, wherein the area enclosed by the supports of the second support system corresponds to between 20% and 40% of the size of an area enclosed by the supports of the first support system.

21. The coordinate measuring machine as claimed in claim 1, wherein the carrier structure is a gantry construction.

22. The coordinate measuring machine as claimed in claim 21, wherein the gantry construction has a gantry movably guided in a first direction (Y) on the base plate, a carriage movably guided in a second direction (X), perpendicular to the first direction (Y), on the gantry and a quill movably guided in a third direction (Z), perpendicular to the first (Y) and second (X) directions, on the carriage.

23. A method for compensating for large workpiece masses on a coordinate measuring machine with a measuring system for measuring a workpiece, a carrier structure for carrying the measuring system and a base plate for supporting the workpiece, wherein the carrier structure is movably guided in at least one direction on the base plate, and wherein the coordinate measuring machine also has a first support system with at least three supports for supporting the base plate, a second support system and a control device for controlling the second support system dependent on a force application to the first support system, comprising the following steps:
  calibrating a reference state of the base plate by means of the first support system,
  arranging on the base plate a workpiece to be measured by means of the coordinate measuring machine,
  determining variables that represent the forces applied to the at least three supports of the first support system by the workpiece, and
  controlling the second support system by means of the control device in such a way that the reference state is restored.

24. The method as claimed in claim 23, wherein, before the controlling step and after the determining step, it is established that the forces applied by the workpiece to the at least three supports of the first support system lie above a predetermined threshold value.

\* \* \* \* \*